Sept. 7, 1965  R. W. DAVIDSON  3,204,581
CARGO LOCKING MECHANISM
Original Filed Feb. 11, 1963  6 Sheets-Sheet 1

INVENTOR.
ROBERT W. DAVIDSON
BY
ATTORNEY

Sept. 7, 1965   R. W. DAVIDSON   3,204,581
CARGO LOCKING MECHANISM
Original Filed Feb. 11, 1963   6 Sheets-Sheet 2

INVENTOR.
ROBERT W. DAVIDSON
BY
Wentworth B. Clapham
ATTORNEY

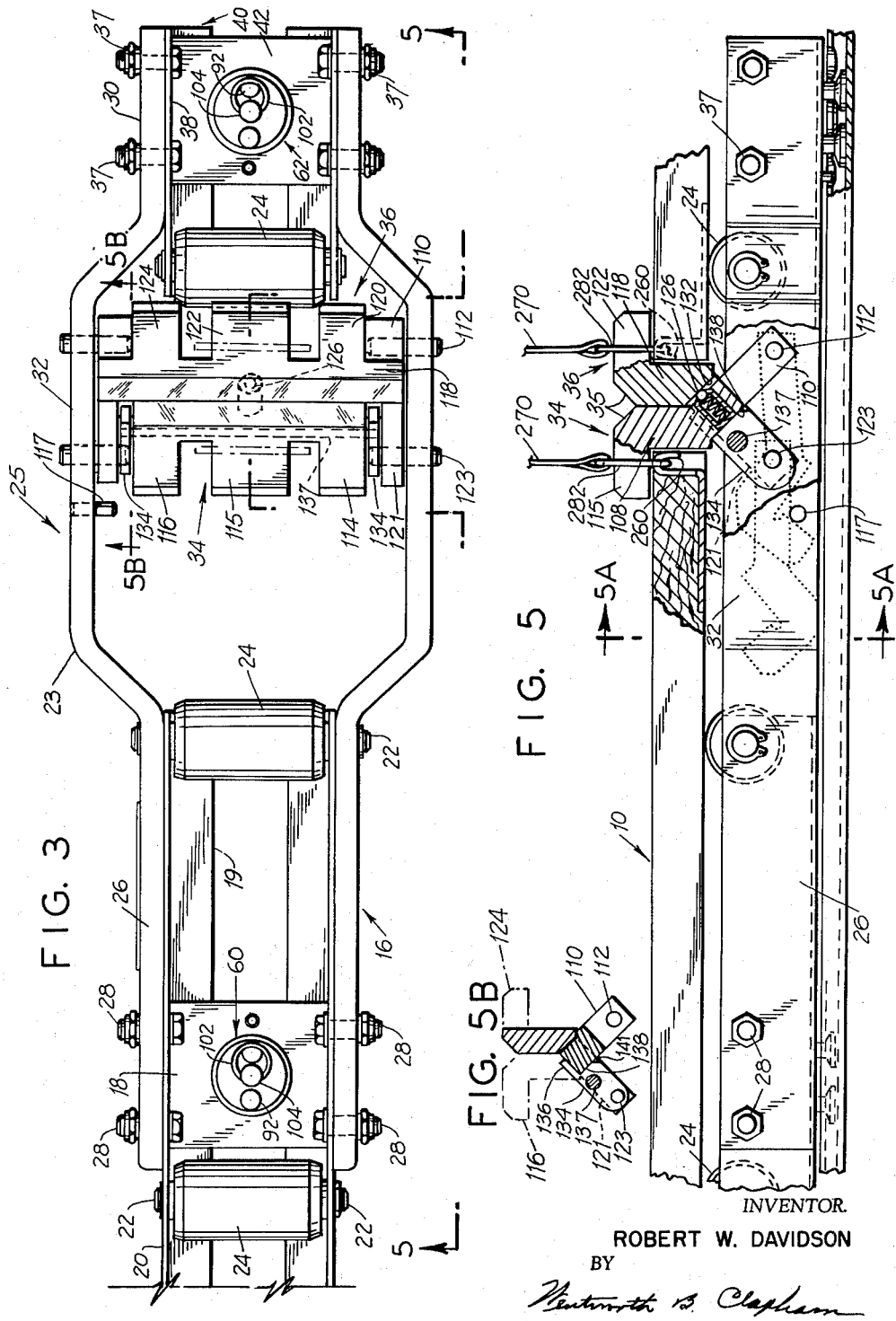

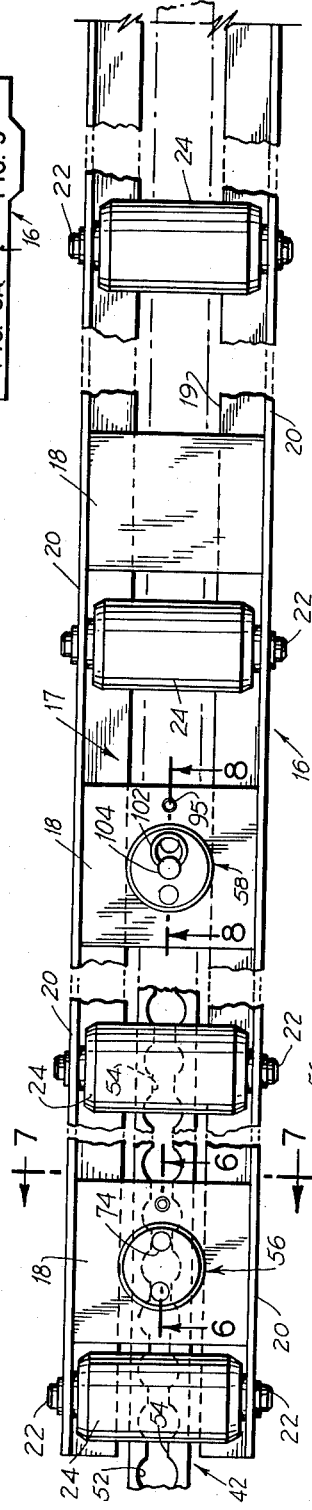

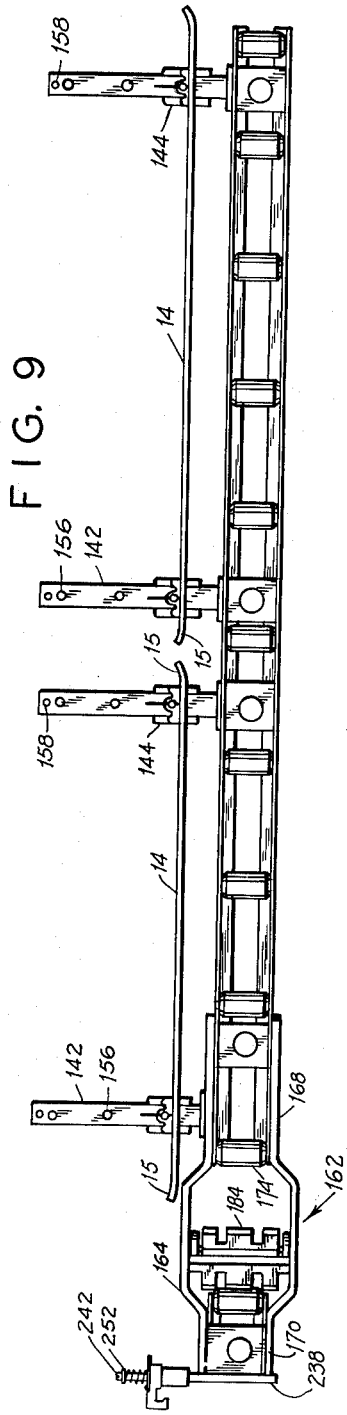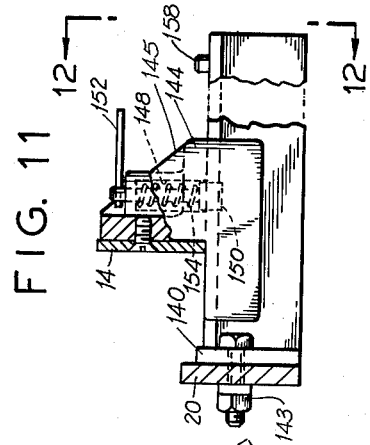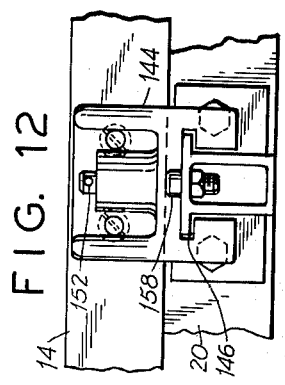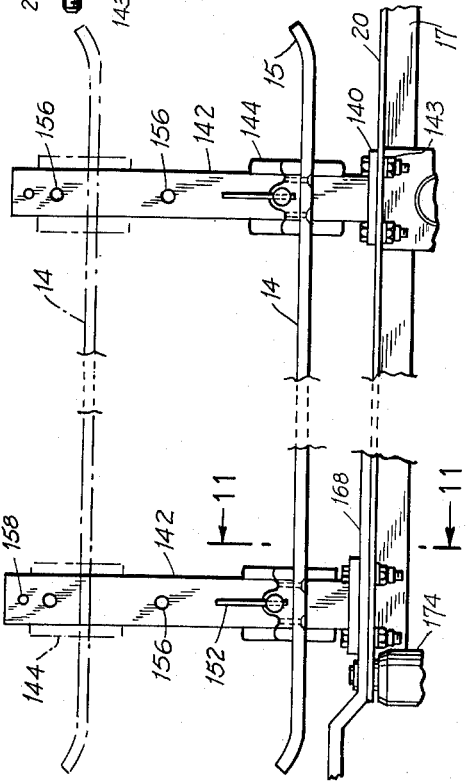
Sept. 7, 1965 R. W. DAVIDSON 3,204,581
CARGO LOCKING MECHANISM
Original Filed Feb. 11, 1963 6 Sheets-Sheet 5
INVENTOR.
ROBERT W. DAVIDSON
BY
ATTORNEY Sept. 7, 1965  R. W. DAVIDSON  3,204,581
CARGO LOCKING MECHANISM
Original Filed Feb. 11, 1963  6 Sheets-Sheet 6

INVENTOR.
ROBERT W. DAVIDSON
BY
ATTORNEY

United States Patent Office 3,204,581
Patented Sept. 7, 1965

3,204,581
CARGO LOCKING MECHANISM
Robert William Davidson, Stamford, Conn., assignor to American Machine & Foundry Company, a corporation of New Jersey
Original application Feb. 11, 1963, Ser. No. 261,930. Divided and this application May 22, 1964, Ser. No. 369,493
18 Claims. (Cl. 105—369)

This is a division of application Serial No. 261,930, filed February 11, 1963.

This invention relates to cargo handling apparatus and more particularly to improvements in apparatus which is operative to restrain palletized or containerized cargo against movement under all load conditions which may occur while vehicles which are transporting such cargo are in motion.

The present invention is readily adaptable for use in all types of commercial vehicles such as trucks, railroads, cars, ships and aircraft. However, it finds particular applicability in high speed carriers, such as modern airplanes, because of the fact that the apparatus embodying the invention is so designed and constructed that heavily loaded pallets can be rapidly loaded into an aircraft, and its load so secured that under all conditions of flight, including emergency crash landing conditions, the cargo will be securey maintained in safely locked condition against movement from the time it leaves its point of departure until it is delivered at its destination.

The ever increasing size and speed of commercial carriers, such as aircraft, cause serious problems in cargo loading and securing. The size and cost of modern airplanes and increased operating expenses are such that it is necessary to unitize, i.e., palletize or containerize, cargo in order that it can be handled and loaded rapidly, thereby insuring economical utilization of payload space, and minimize turn around time of crew and aircraft. Because the loads carried are very heavy (a modern cargo airplane can carry as much as 88,000 pounds), and loaded pallets or containers or units may weigh as much as 10,000 pounds, unless they are adequately secured against shifting or movement, and in such manner that requirements of the Federal Aviation Agency are met, they can break loose and become, in effect, missiles, which obviously would endanger the lives of the crew of the carrier in which they are transported. This is especially the case in the shipment of cargo in aircraft wherein all of the payload space may be devoted to transportation of cargo or freight, or where only a portion thereof may be used for cargo or freight and the rest being given over to the transportation of passengers. In such case if any portion of a cargo breaks loose the lives of the passengers and crew may be subject to constant danger of injury and even loss of life on take off, during flight or on landing, including emergency crash landings.

Attempts have been made heretofore to provide apparatus for securing palletized cargo or freight for transportation in vehicles, such as aircraft. However, even though pallets have been secured to the floor of the vehicle, it has been found necessary to use auxiliary securing means in order to provide for all contingencies which might arise during the movement of the carrier from point of departure to its destination. In the case of cargo carrying airplane it has been necessary to use barrier nets or transverse partitions between pallets and loads in longitudinally spaced arrangement within the carrier, such as an airplane, so that if for any reason a palleted load should break loose from its securing means the barrier nets or transverse panels would prevent "missiling" of the breakaway load. Many other schemes have been tried to solve the problem of providing satisfactory load securing means for insuring safe transport of freight in flight under all conditions as take-off, flight, landing and possible survivable crash landing of an airplane. Despite the many attempts heretofore that have been made in the art to provide satisfactory cargo handling apparatus, as far as it is known, no one has been able to meet the requirement of the Federal Aviation Agency that the cargo handling system be able to withstand a force of nine times gravity or a force of 9 $g$'s without breakaway failure of the cargo handling apparatus.

The present invention constitutes a solution of the problems mentioned above because it provides a cargo handling apparatus or system in which a palletized load is so contained that the pallet per se plays but a small part in the successful resistance of force imposed upon the load under all conditions of travel. This is due to the fact that the containing means for a load on each pallet is firmly and securely held by mechanism embodying the invention to the floor of the carrier so that even under the most severe flight conditions total loads up to the certified payload carrying capacity can effectively withstand nine times the force of gravity or 9 $g$'s without failure.

The cargo handling apparatus embodying the invention also is extremely versatile in use because it can satisfactorily handle and secure loads which are supported on extremely simple, inexpensive pallets, and also function equally well in securing heavy, rigid pallets for safe transportation from point of departure to a destination when the cargo is removed from the carrier.

It is an object of the invention to provide a novel cargo handling apparatus which is capable of handling very heavy palletized loads and in which the load is directly secured to the floor of the carrier so that the pallet plays but a small part in the safe, secure, attachment of the load to the floor of the carrier for transportation.

The invention is further characterized by the provision of a plurality of tracks formed of tandemly arranged roller trays with which coact opposed sets of locking dogs operative to secure the container or a palletized load to the floor of a carrier, such as an airplane, in order that each palletized load transported by the airplane will be safely secured against any failure or breakaway, during the most severe conditions including a survivable crash land to which the airplane may be subjected.

The invention is further characterized by the provision of a novel cargo handling apparatus wherein there is provided on the floor of an airplane or other carrier in which the apparatus is installed a plurality of laterally spaced tracks formed of tandemly arranged roller trays which allow loaded pallets to be moved without difficulty onto selected spaced portions thereon where each load on each pallet can be secured by locking dogs to the floor of the airplane in such manner that even under the most adverse flying conditions including the subjection of the loads on the pallets to forces of nine times gravity, the loads will not break loose but will be carried safely to their destination.

The invention is further characterized by a novel cargo handling apparatus for use in carriers, such as airplanes, wherein the floor of an airplane is provided with a novel load supporting system over which loads can be moved and wherein locking means are so disposed with respect to the pallets being moved into transport position within the planes that they do not present any obstruction to the motion of the pallets and wherein after the pallets have been positioned in their transport positions the locking means are moved into operative relationship either with the pallets or with the nets which contain the cargo on the pallets such that the loads on each pallet can withstand even the severest conditions of flight to which an airplane may be subjected without break-away which would endanger the lives of the passengers or crew.

It is a further object of the invention to provide a novel method for handling cargo loaded pallets wherein the means which contain the cargo on a pallet are secured not only to the pallet but also to the pallet supporting floor of a vehicle for transportation under the most rigorous conditions without break-away or unwanted movement.

With these and other objects not specifically mentioned in view, the invention consists in the novel features pointed out and described more in detail hereinafter, and set forth in the claims hereunto appended.

In the accompanying drawings which form a part of this specification, and in which like characters of reference indicate the same or like parts:

FIGURES 3 and 3A taken together constitute a plan view of a roller tray embodying the invention.

FIGURE 4 is a diagrammatic plan view of the assembled relationship of FIGURES 3 and 3A.

FIGURE 5 is a side elevation of the mechanism shown in FIGURE 3.

FIGURE 5A is a sectional view taken on line 5A—5A in FIGURE 5.

FIGURE 5B is a sectional view of a detail of the dog locking mechanism.

FIGURE 6 is a sectional view taken on line 6—6 in FIGURE 3A.

FIGURE 7 is a sectional view taken on line 7—7 in FIGURE 3A.

FIGURE 8 is a sectional view taken on line 8—8 in FIGURE 3A.

FIGURE 9 is a plan view showing one of the outer roller trays provided with side guides.

FIGURE 10 is an enlarged partial plan view of a portion of the mechanism shown in FIGURE 9.

FIGURE 11 is a sectional view taken on line 11—11 in FIGURE 10.

FIGURE 12 is an end view taken on line 12—12 in FIGURE 11.

Figure 13:
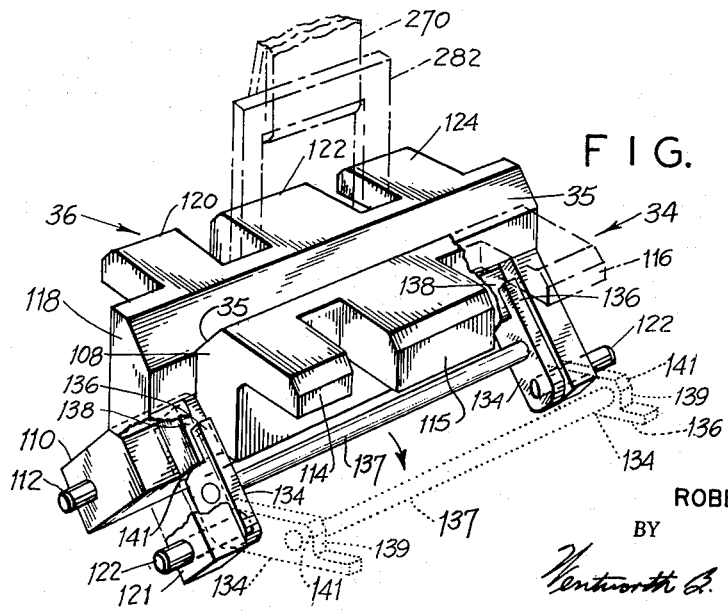

FIGURE 13 is a perspective view of the locking dogs of a roller tray in their operative positions.

Figure 14:
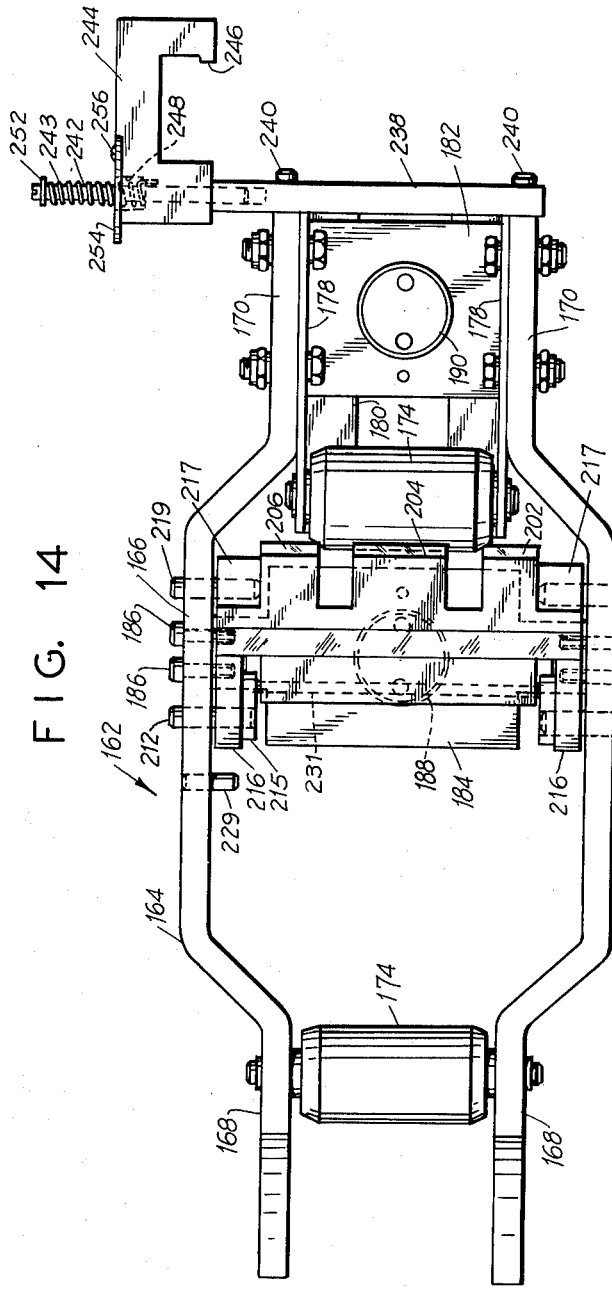

FIGURE 14 is a plan view of an auxiliary or terminal roller tray unit.

Figure 15:
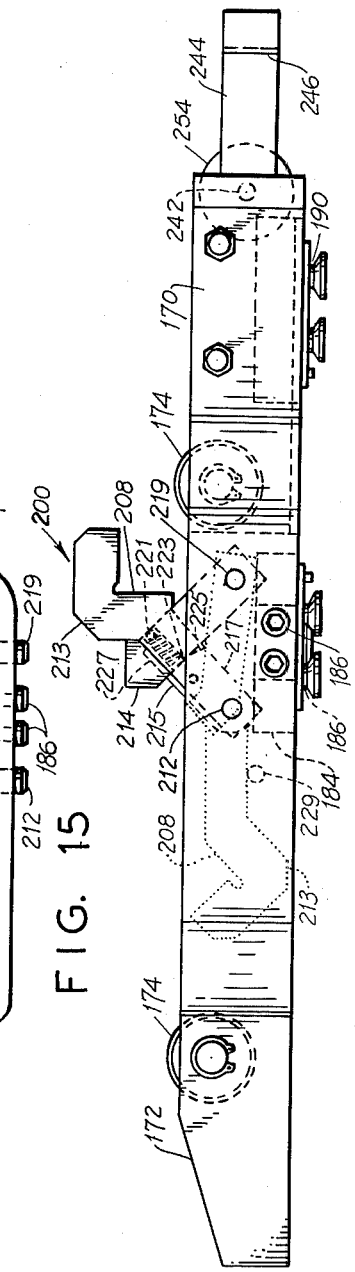

FIGURE 15 is a side view of the device shown in FIGURE 14.

Cargo handling apparatus embodying the invention is readily adaptable for installation and use in many types of vehicles and carriers such as aircraft, trucks, railroad cars and ships. For purposes of illustration it is shown herein as applied to an airplane in which all or a part only of the pay load carrying space is used for carrying freight and cargo.

Figure 1:
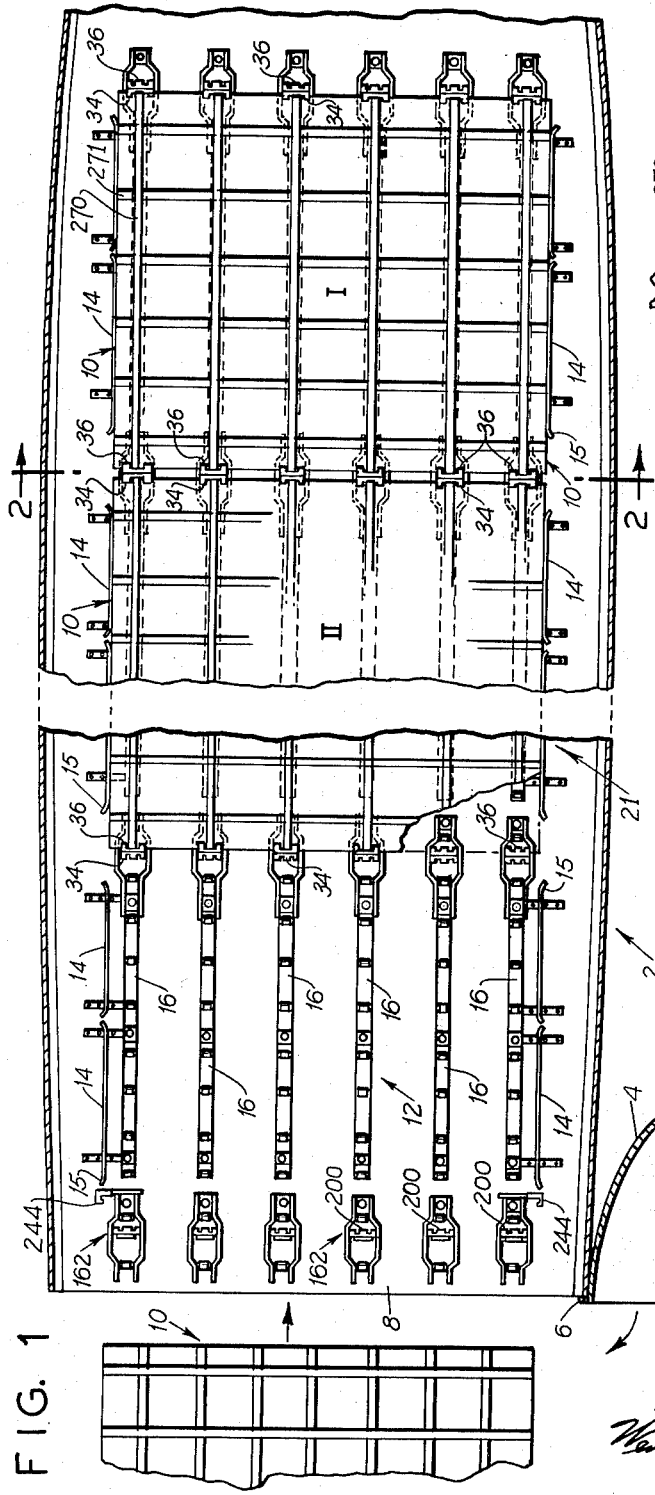
FIGURE 1 is a partial plan view showing a preferred embodiment of the invention as installed in a vehicle, such as an airplane.

FIGURE 1 discloses an airplane 2 of the type having a tail 4 hingedly connected thereto at 6 in such manner that when tail 4 is swung to the position shown, a delivery apparatus (not shown) can be located adjacent open tail door 8 for delivery of a loaded pallet 10 therethrough into the airplane 2. As shown in FIGURE 1, two loaded pallets 10 have been secured in an airplane 2 in their proper flight positions I and II. While no specific apparatus is disclosed for delivering loaded pallets into airplane 2, it will be appreciated that any suitable known type of machine, such as a cargo carrier with a lift platform, may be used to locate loaded pallets in such relationship to door 8 that they can be pushed into airplane 2 along the cargo handling apparatus embodying the invention and secured thereon for transportation.

Figure 2:
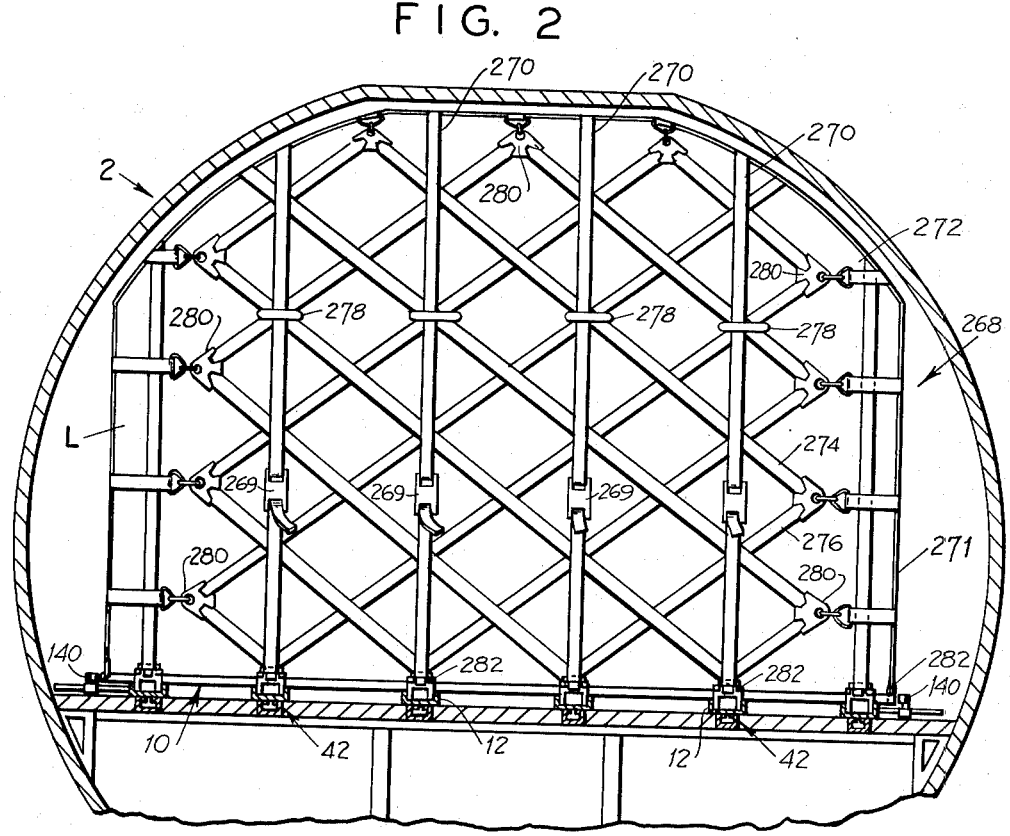
FIGURE 2 is a cross sectional view taken on line 2—2 in FIGURE 1.

Referring to FIGURES 1 and 2 it will be seen that in accordance with the invention the floor of airplane 2 is fitted with a plurality of detachable elongated tracks, designated generally 12, thereby providing a roller conveyor installation 17. It will be appreciated that tracks 12 could be permanently connected to the floor if desired. These tracks extend longitudinally along the airplane and their length is determined by the amount of space in an airplane being used for cargo. In some airplanes, all available space is not used for cargo, the remainder being employed for carrying passengers. In the system illustrated herein there are six (6) elongated tracks 12; two outer tracks having guides 14 referred to in more detail hereinafter, and four (4) central tracks. Tracks 12, which preferably are spaced equidistantly across the floor of airplane 2, are held securely thereto, as described more fully hereinafter.

However, it will be appreciated that tracks 12 can be arranged in some other symmetrical or asymmetrical order in order to meet transportation requirements and in order to adapt a particular airplane to carry cargo, as for example, when seats are removed from a plane and its seat rails or other hold down means are used for holding tracks 12 in operative position in the airplane. In short, the spacing of these rails or hold down means determines the installed arrangement of tracks 12.

Each track 12 comprises one or more elongated roller trays or conveyors 16. In the installation shown in FIGURE 1, where a plurality of roller trays 16, which may be termed modular trays or conveyors, form each track 12, they are arranged in an end to end or tandem relationship. The number of trays 16 in each track for a given installation depends upon the length of the cargo space given over to cargo and freight hauling. Referring to FIGURES 1, 3, 3A and 4, it will be seen that each roller tray 16 in the form illustrated is made up from two elongated spaced angle members 17 secured together by plates 18, as by welding or any other suitable manner. Angle members 17 have upstanding legs 20 in which are suitably supported shafts 22 carrying low friction ball or roller bearing mounted transversely extending rollers 24. Rollers 24 preferably are spaced equidistantly along legs 20. The preferred lengthwise spacing between roller trays 16 is such that the spacing between the last roller 24 of one tray 16, and the first roller 24 of the next adjacent tray 16 is approximately the same as that between rollers 24 in each tray 16. This arrangement insures continuity of roller support and, hence, ease in handling in the movement of loaded pallets along tracks 12 into and out of their hold down flight positions in loading and unloading an airplane.

As illustrated in FIGURES 1, 3, 4, 9, and 16, one end of each roller tray 16 is provided with a locking or hold down section or unit, designated generally 25. Although hold down section 25 is shown at one end of a tray 16, if desired, it could be located at an intermediate point thereof. This section comprises two laterally spaced coupler plates 23 having inner ends 26, outer ends 30 and central portions 32. Inner ends 26 of plates 23 are attached to outer faces of legs 30 of angle members 17 by bolts 28. Outer ends 30 are attached by bolts 37 to the outer faces of upstanding legs 38 of angle members 40 which are secured together, as by welding, to plate 42. Plates are so bent or shaped that central portions 32 thereof are spaced apart a distance greater than the spacing between inner and outer ends 26 and 30, respectively, so as to provide sufficient space for the mounting and operation of its locking or hold down dogs. Legs 38 of the inwardly extending portions of angle members 40 support a transverse conventional low friction type roller 24, in a manner similar to the other rollers 24 of trays 16.

Each roller tray 16 is quickly detachably secured to the floor of airplane 2. In modern aircraft, provisions usually are made for attaching seats to the floor and that they can be removed, and relocated in such spacing as desired, and such means are used in the practice of the invention. Among the means by which seats are readily removable are tracks or rails formed in the floor beams, as an integral part of the extruded beams, or by tracks or rails rigidly attached to the floor of the airplane by screws or bolts. The latter system is shown in FIGURES 2, 3A, 6, 7, and 8. Integral rails 43 are shown in FIGURES 5 and 5A.

Roller trays 16 are provided with a plurality of locking fittings, each having locking elements 48. Referring to FIGURES 3 and 3A, it will be seen that four locking fittings 56, 58, 60, and 62 are provided in all but the outer trays where there are five, and that they are mounted in plates 18 in roller tracks 16. The number of locking fittings required, which can vary, must be consistent with the weight of cargo to be carried on a particular pallet, and with the aircraft structure. The main point is that an adequate number of locking fittings be provided so that each roller tray under load can never come loose from the vehicle to which it is attached under any conditions unless and until it is removed by a designated person or operator. The arrangement of locking units 56–62 described above is typical for a particular roller tray 16. However, a different distribution arrangement can be made, if desired, it being noted that unit 56 is a vertical tension fitting which is different from units 58–62 which are vertical tension and horizontal shear fittings.

Unit 56 comprises a circular block 64 having a shoulder portion 66 and a cylindrical body portion 68, adapted to seat loosely, respectively, in circular bores 70 and 72 formed in plate 18 located at the extreme left in roller tray 16 as viewed in FIGURE 3A. Threadably mounted in block 64 are two depending screws 74 having tapered heads or locking elements 48 of a shape of the head of slot 45. As shown in FIGURE 7 locking elements 48 are held positioned beneath locking lips 54 of track 42 between openings 52 through which locking elements 48 are inserted. Locking elements 48 are somewhat smaller in diameter than openings 52 in order that first they may be inserted therethrough into track 42, and then moved beneath lips 54 when a tray 16 is being locked to a selected rail 42.

The shanks of screws 74 are provided with cylindrical enlargement 76 adjacent locking elements 48. These act to support a plate 78 (see FIGURES 6 and 7) having holes through which screws 74 pass. A pin 80 press fitted into plate 18 extends downwardly through an enlarged hole 83 and prevents rotation of unit 56.

Units 58, 60 and 62 each comprises a body member 84 having a shoulder 86 adapted to seat loosely in bores 88 and 90, respectively, formed in supporting plates 18. The construction of these units is shown in detail in FIGURE 8. Each unit 58–62 is provided with screws 92 having heads or locking elements 49 which coact with slot 45 in the same manner as do locking elements 48 of unit 56. A plate 94 located between shoulders 93 of screws 92 and the inner face of body member 84 prevent rotation of units 58–62 in trays 16. This is effected by means of press fitted pin 95 carried by each plate 18 (see FIGURE 8) which extends through hole 97 in plate 94. Plates 78 and 94 lie between the two spaced bottom legs 19 of angle members 17.

Each of units 58, 60 and 62 is provided with an operating pin 93. One end of pin 98 is formed with an enlarged cylindrical shoulder 100; the other end carries an operating member, such as a ring 102 pivotally mounted in an enlarged head portion 104. A spring 106 encircling pin 98 bears against head portion 104 and normally tends to force pin 98 downwardly in body portion 84 and through an opening in plate 94.

When a roller tray 16 is being installed preferably the left end portion thereof, as viewed in FIGURES 1 and 3A, is positioned relative to a track 42 in the vehicle in which it is being installed in such manner that locking elements or heads 48 of locking unit 56 pass through openings 52 in track 42 and enter slot 45. Tray 16 then is given a push, either to the right or to the left thereby locating heads 48 beneath lips 50.

Concurrently with the sliding movement of locking heads 48 of locking unit 56 beneath lips 50 of track 42, locking heads 49 of units 58, 60 and 62 likewise slide in slot 45 and are located beneath other locking flanges or lips 54 thereof. However, in the operation of units 58–60, when heads 49 are located properly, shoulders 100 of pins 98 are pressed by spring 106 into the opening 52 between the two lips 54 engaged by heads 49 and thus track 16 becomes firmly locked or anchored to the floor of the vehicle.

Shoulders 100 are so shaped with cut out oppositely spaced portions that when ring 102 is pulled upwardly and turned a shoulder 100 will be held in a detent position, whereupon all units 58, 60 and 62 can be either installed or removed. When installed rings 102 and in turn heads 104 are turned back and springs 106 force shoulders 100 into holding engagement.

Referring to FIGURES 1, 3, 5, 9, and 13 the locking dog section 25 of each roller tray 16 comprises a pair of locking dogs 34 and 36. As shown in FIGURE 1, each locking roller tray 16 is positioned, when installed, such that its locking dog section 25 extends forwardly in the vehicle or carrier. Thus, locking dog 34 may be termed a fore dog, and dog 36 may be designated an aft dog. This is due to the fact that, as illustrated in FIGURE 5, dogs 34 restrain the front portion of a palletized load, and dogs 36 perform a similar function with reference to the rear portion of the adjacent load.

It will be apparent from a consideration of FIGURES 1 and 16, that a cargo handling apparatus constructed in accordance with the invention is made up of a plurality of tracks 12, and that in turn each track installation may comprise several end to end roller trays 16. The number and spacing of tracks 12 depends upon loading restrictions and the extent of the area of the floor of the aircraft or other carrier in which the system embodying the invention is used. By the appropriate number and arrangement of tracks 12 the present invention can meet successfully all loading conditions imposed upon a given airplane or carrier.

Locking dog 34 (FIGURES 1, 5, 5A, 9, and 13) comprises a transverse block member 108 and two spaced legs 110, one at each end thereof loosely pivotally supported in pins 112 in central portion 32 of plates 23 of unit 25. Projecting outwardly from block member 108 and substantially at right angles thereto are three hold down lugs 114, 115 and 116 (FIGURES 3, 5A, and 13). Central lug 115 is wider and thicker than lugs 114 and 116 which form an operating pair. The reason for this is that lug 115 is used in handling one type of pallet 10, whereas lugs 114 and 116 are used with another, for reasons described more in detail hereinafter. The cross sectional area of lug 115 and that of both lugs 114 and 116 are approximately the same.

Locking dog 36, which is complementary to dog 34, comprises a transverse block member 118 having two spaced legs 120, one at each end, loosely pivotally mounted on pins 123 supported in central portion 32 of coupler plates 23 (see FIGURE 3). Projecting outwardly from block 118 and substantially at right angles thereto are lock lugs or fingers 120, 122, and 124. As in the case of lug 115, lug 122 is wider and thicker than lugs 120 and 124 which are spaced therefrom on its opposite sides for the same reason as lugs 114 and 116.

The cross sectional area of lug 122 is substantially the same as that of both lugs 120 and 124. Positive locking means are provided for preventing the movement of dogs 34 and 36 out of their operative positions. This comprises locking arms 134 which are connected by cross rod 137 and are mounted for swinging movement on pins 123 from the broken line to the full line position, shown in FIGURE 13. Each locking arm 134 is provided with a cam face 139 and a chamfered corner 141 which coacts with shoulders 138 on legs 110 of dog 34 to maintain dogs 34 and 36 locked against separating movement. An extension 136 on each arm 134 acts as a stop to engage a portion of legs 110 and thereby limit downward movement of arms 134, as viewed in FIGURE 13. Locking arms 134 rigidly hold dogs 34 and 36 in their operative positions until arms 134 are swung manually out of engagement with shoulders 138, whereupon dogs 34 and 36 can be returned to their inoperative positions, shown in broken lines in FIGURE 5.

The chamfered corner 141 on cam face 139 assists in the camming locking action of lock arms 134 as they are moved home to lock dogs 34 and 36 together. The cam face 139 maintains lock arms 134 in operative position such that any increase in load on a dog 34 or 36 means that more force would have to be applied to swing arms 134 out of locking position. In other words, if the load on dog 36 is such as might be encountered in an upwardly sloped aircraft, is in excess of that which an operator could apply to hold the load back, then he would be unable to swing arms 134 out of locking engagement and thus unlock dogs 34 and 36.

Block member 108 is provided with a spring ball type detent 126 mounted substantially centrally thereof. Detent 126 comprises a spring 128 which bears against and urges ball 130 outwardly through an opening in a detent cellar into engagement with face 132 of block member 118 of dog 36. Detent 126 functions to exert a slight pressure on block member 118 tending to force dogs 34 and 36 apart, which prevents locking arms 134 from being opened, as by vibration, during flight or a trip.

It is an important feature of the invention that when cargo is being loaded into a vehicle or carrier, such as airplane 2, locking dogs 34 and 36 of all trays 16 be located below the level of all rollers 24. Locking dogs 34 and 36 are chamfered, as at 35. This allows them to seat lower in their supporting trays 16 with dog 36 resting on the floor of the airplane. See FIGURE 5. Thus, neither of the dogs 34 and 36 nor any parts thereof, at any time offer an obstruction to the free movement of pallets on trays 16. A stop pin 117 projecting outwardly from central position 32 of one of side plates 23 when engaged by one of the legs 120 of dog 36 within the confines of a tray 16 when it is removed from an airplane 2.

Referring to FIGURE 1, it will be seen that in the system installed in airplane 2, all of the locking dog sections 25 of the several longitudinally arranged and laterally disposed and installed trays 16 are so located that their respective locking dogs 34 and 36 are disposed in a predetermined transverse alignment for proper coaction with the cargo or load containing means, hereinafter described. Thus the containing means of pallet 10 at position I and pallet 10 at position II are properly restrained by sets of transversely aligned locking dogs 34 and 36 against the inertial forces caused by movement or motions of the aircraft. The same operative arrangement obtains with respect to all other pallets 10 to be loaded in airplane 2.

As mentioned hereinabove outer trays 16 and tracks 12 formed from an installed longitudinally aligned group of trays 16 are provided with guides 140 for properly locating pallets laterally 10 within airplane 2, and to absorb transverse forces caused by the movement or motion of the aircraft. Although a single side guide or rail 14 might be provided for each outer tray 16, it has been found expedient to use two to more uniformly support the side forces. As shown in FIGURES 1, 2, and 9–12 inclusive, the outer leg 20 of angle member 17 of each outer roller tray 16 has attached thereto by bolts 143 two pairs of longitudinally spaced brackets 140. Each bracket 140 is provided with an elongated generally T-shaped extension 142 on which is slidably mounted a guide support bracket 144 to which side guide or rail 14 is attached. The ends of side guides or rails 14 preferably are curved as at 15 to facilitate movement of loaded pallets 10 therealong.

Each bracket 144 is provided with a generally T-shaped slide portion 146 by means of which it is seated on bracket extension 142 for movement therealong to a predetermined adjusted position. Brackets 144 are provided also with vertical bores 148 in which are located stop pins 150, which carry a transverse lifting handle or pin 152. A spring 154 encircling each stop pin 150 and bearing against the top of bore 148 and an enlarged shoulder on stop pin 150 normally forces stop pin downwardly into a recess or hole 156 formed in extension 142. There are spaced holes in each extension 142 so that a plurality of adjustments of side guides 14 can be made in order to effect the accommodation of various widths of pallets 10. The desired adjustment of side guides 14 is made by lifting up on handle 152 which results in the removal of stop pin 150 from one of the holes 156 so that bracket 144 can be slid along extension 142 to another desired location. Inclined faces 145 on bracket 144 provide cam surfaces along which handle 152 can be moved to bias locking pin 150 upwardly out of a hole 156 against the pressure of spring 154. Handle 152 is supported by the top of cam face 145 during the inward or outward adjustment of side guides 14, after which it is turned in the opposite direction, and pin 150 is pressed into a hole 156.

Referring to FIGURE 1, it will be seen that each cargo handling apparatus 21 embodying the invention comprises a plurality of tracks 12 each including a short length of roller tray or a terminal roller tray or roller conveyor, designated generally 162, which forms the terminal continuation of each track 12 of an installation. In the installation disclosed herein track 12 extends from a point to the right within airplane 2, as viewed in FIGURE 1, to a point adjacent the loading door 8.

Each terminal roller tray 162 comprises two side of coupler plates 164. These plates are shaped so as to form a widely spaced central portion 166 and two end portions 168 and 170 closer together but at a distance which is slightly greater than the spacing between upstanding legs 20 of a roller tray 16. As viewed in FIGURES 14 and 15, end portion 168 is tapered, as at 172, so as to present an inclined planar surface for entry of a loaded pallet onto the series of laterally spaced and aligned termined roller trays 164, as viewed in FIGURE 1. Mounted in end portion 168 is a ball or roller bearing mounted roller 174 similar in construction and function to rollers 24 in trays 16. End portions 170 of plates 164 are attached by bolts to upstanding legs 178 of angle members 180 which are secured together by cross plate 182. The free ends of legs 178 support a transverse roller 174 which is similar in construction and function to rollers 24 in trays 16. The spacing between rollers 174 is approximately the same as that between rollers 24 in trays 16. A generally cross shaped connecting plate 184 attached to coupler plates 164 by screws 186 strengthens the tray assembly and also serves as a support for locking unit 188. This locking unit is similar in construction and operation to locking units 58, 60 and 62 described hereinabove and shown in FIGURE 8. Mounted in plate 182 is a second locking unit 190 which is similar in construction and operation to locking unit 56 described hereinabove and shown in FIGURES 6 and 7. Terminal trays 162 are installed in an airplane 2 on rails or tracks 42 in the same manner as tracks 16. The distance end to end between trays 162 and 16 preferably is such that rollers 174 and 24 are approximately equidistant.

Referring to FIGURE 1, it will be seen that terminal roller trays 162 constitute the rear end of any group of tandemly installed trays 16 in an airplane 2. Therefore, terminal trays 162 are provided with only one active dog 200, which corresponds in function to dog 36. Each dog 200 is provided with legs 217, one at each end of body 208, pivotally mounted on pins 219 in plates 166. Each dog 200 also has three spaced operating lugs 202, 204 and 206 which extend outwardly substantially at right angles from body 208 thereof. Lugs 202, 204, and 206 correspond to lugs 120, 122 and 124 on dog 36. Coacting with dog 200 is a member 214 which as shown in FIGURES 14 and 15, is provided with a spring urged detent or pressure finger 221 (similar in construction and operation to detent or pressure finger 126, described hereinabove), preferably located centrally in member 214 and which detent or finger bears resiliently against body 208 of dog 200 when the latter is in its operative position shown in FIGURE 15. Member 214 is provided with legs 217 pivotally supported on pins 219 mounted in plates 166.

Dog 200 is held in its operative locking position by means of locking arms 214 connected by rod 231 and pivotally mounted on pins 212 supported in plates 166. Each of these arms is provided with a cam face 223 having a chamfer 225 and a stop projection 227 which engages a shoulder on legs 217 to limit downward motion of locking arms 215 in a clockwise direction as viewed in FIGURE 15 when cam face 223 is lodged against the under surface of member 214 as shown in FIGURE 15, at which time dog 200 is maintained in locked relationship with respect to member 214. As in the case of the construction disclosed in FIGURE 5, detent or finger 221 tends to separate dog 200 from member 214 and by means of this coaction, locking arms 215 are maintained in their proper locking relationship and separation or unlocking of dog 200 with respect to member 214 cannot occur despite any vibration or shock to which dog 200 may be subjected while it is in locking relationship with a palleted load supported on tracks 16 in a carrier such as airplane 2. A chamfer 213 extending along the entire upper surface of dog 200 allows it to set well below the operating limits of rollers 174 in terminal tray 162. A pin 229 extending outwardly from the inside face of one plate 166 maintains dog 200 in the position shown in FIGURE 15, when tray 162 is removed from airplane 2 or other carrier in which it was installed.

The structure described thus far is designed primarily for use with loads on pallets 10 of the type shown in FIGURES 19, 22 and 23 in copending application Serial No. 261,930.

Referring to FIGURES 14 and 15, terminal tray 162 is provided with a cross plate 238 secured by screws 240 to the ends of coupler plates 164 adjacent plate 182. Threadably mounted in one end of cross plate 238 and extending laterally beyond tray 162 is an elongated pin 242 on which is loosely swingably mounted a U-shaped lock device 244 having an inturned lip 246 on the free leg of the U. Device 244 is provided with a bore 248 in which is located one end of a spring 243 which encircles pin 242 having one end anchored in the base of bore 248 and its other end bearing against washer 252 secured to the head of threaded pin 242. A circular plate 254, which serves as a hand grip, is attached by screw 256 to lock device 244. While lock device 244 is shown in its operative relationship with a terminal tray 162, it will be understood, see FIGURE 9, that it can also be mounted on and operate in the same manner when installed on any of the trays 16 forming the outer tracks of an installation, such as shown in FIGURE 1.

In the description hereinabove it has been noted that dogs 34, 36 and 200 are provided with three laterally spaced securing elements 114–116, 120–124 and 202–206, respectively. This construction provides a versatile cargo handling system, in that it makes it possible for the same system to accommodate more than a single type or size of pallet severally or in combination, and interchangeably with aircraft of differing basic configurations.

It should be noted that once locking arms 134 are moved home to locking positions, as shown in FIGURES 3, 5, and 13, and the next loaded container, unit or pallet 10 has been so positioned as shown in FIGURE 5, arms 134 cannot be moved out of locking coaction with legs 110 of dog 34 until, during unloading, this or corresponding pallets 10 have been moved away from dogs 34. Space is provided between the top of pallets 10 and lugs 115 and 122 of dogs 34 and 36, respectively which facilitate horizontal movement of pallets during loading and unloading operations. Dogs 200 in terminal trays 162 are maintained locked as described hereinabove until unloading is to begin, at which time locking arms 215 are moved to their inoperative position and dogs 200 likewise can be moved to their inoperative positions, as indicated in broken lines in FIGURE 15.

The versatility of the cargo handling apparatus embodying the invention becomes even more apparent when it is considered that the roller trays 16 and 162 described hereinabove are both stowable and stackable. By means of this construction, when trays are removed from an installation 21 or 23, such as shown in FIGURE 1, they can be stowed in portions of the body of an airplane and carried therewith. Hence, if the load to be carried on the return flight of the airplane requires the use of additional modular conveyor units, trays 16 and/or 162 can be removed from their storage place in the airplane and reinstalled as required in order to meet the particular demands of the cargo to be handled.

It will be seen that the invention provides an extremely versatile and novel locking mechanism for cargo handling system in which vehicles or carriers, such as aircraft, can be loaded to their full allotted capacity and wherein it is unnecessary to provide auxiliary means, such as "barrier nets" or transverse partitions, attached to the carrier between loaded pallets in order to insure the safe transit of a load to its destination. In other words, by means of the novel structure embodied in the invention, full capacity loads can be carried on commercial aircraft, without restrictions on cargo loads to considerably less than normal aircraft capacity.

What is claimed is:

1. Locking mechanism for use in securing loaded units in a carrier against substantial movement when said carrier is in motion, comprising a pair of complementary locking dogs, each of said dogs including a body portion and a locking lug carried by said body portion extending outwardly at substantially right angles therefrom, legs forming an integral part of said body, means mounting said legs for movement of the rear faces of each body portion into engagement with each other with said lugs located in opposite directions to each loaded unit against such movement when said lugs are disposed in operative relationship and means securing said dogs in said operative relationship.

2. The mechanism defined in claim 1 including locking arms, a cam surface formed on each of said arms, and means for moving said arms to engage said cam face with a portion of the legs of one of said dogs to lock said dogs in said operative relationship, and stop means on said arms for limiting the movement of said arms.

3. The mechanism defined in claim 2 including a spring pressure unit, means mounting said unit in one of said body portions to engage the other of said body portions when said dogs are in operative positions, said unit tending to separate said dogs and thereby more firmly secure said dogs in locked relationship.

4. A cargo latch comprising a frame, a pair of complementary locking dogs, means pivotally mounting said dogs in said frame, with each of said dogs having a holding portion facing it in opposite directions, and means supporting said dogs within the confines of said frame when said dogs are in their inoperative positions for movement into operative positions with their holding portions above said frame and facing in opposite directions.

5. A locking device comprising a first locking member, a coacting second locking member, a support for said locking members, said first locking member having a body portion, a locking portion and spaced legs extending from said body portion, said second locking member having a body portion and a locking portion, means movably mounting said members in said support with the body portion and locking portion of said second locking member disposed between said legs of said first locking member, means for positioning said locking portions thereof extending above said support and with said locking portions facing in opposite directions, and means for securing said locking members in such positions.

6. A cargo latch, comprising a frame, a pair of locking dogs pivotally mounted in said frame, means mounting said dogs in said frame with said dogs disposed within the confines thereof and with one dog located in complementary relationship with the other, the construction and arrangement being such that one dog may be moved to operative position over the other, and the other dog may be raised to operative position facing in the opposite direction, and means for maintaining said dogs in such operative positions.

7. A locking device of the type described for use in securing cargo against movement in a carrier comprising a frame, a generally U-shaped locking member having angularly disposed locking faces, a coacting generally T-shaped locking member having angularly disposed locking faces, means movably mounting said locking members in longitudinally spaced relationship in said frame with the leg of said generally T-shaped locking member located between the legs of the U of said generally U-shaped member, whereby when said locking members are raised relative to each other to operative positions above said frame said generally U-shaped locking member straddles said leg of the T of said generally T-shaped locking member, and said locking faces are disposed in said oppositely facing directions, means for maintaining said locking members in said operative positions, and means for attaching said frame to said carrier.

8. A cargo latch of the type described comprising an elongated frame having laterally spaced side walls, a first locking member, a second coacting locking member, at least one cargo holding face on each of said locking members, means movably mounting said locking members in said frame such that said locking members are located within the vertical limits of said side walls when said locking members are disposed in inoperative positions, and one of said locking members straddles the other with its locking face located in the opposite direction from the locking face of the other and above said side walls of said frame when said locking members are positioned in operative positions, and means for securing said locking members in said raised locking positions.

9. A cargo latch apparatus comprising a pair of oppositely facing locking dogs, one of said dogs being arranged to assist in securing one cargo unit and the other of said dogs being arranged to assist in securing an adjacent unit, a frame including two spaced parallel side plates, means pivotally mounting said dogs in said plates, and means on one of said dogs and coacting with said dogs of maintaining them in substantially back to back operative relationship above said side plates for securing cargo units against movement.

10. A cargo restraining device comprising in combination, a frame, a pair of locking members carried by said frame, each of said members including at least one locking portion, means carried by said frame for supporting said members in a generally horizontal relationship within said frame with said locking portions facing in opposite directions when said members are in their inoperative positions, means mounting said locking members in the said frame for movement upwardly out of said frame to erected operative positions, and means for securing said members in their erected operative positions to locate said locking portions of said members in oppositely facing directions to secure cargo against restraint.

11. A cargo latch for use with a support track, comprising a frame, a pair of normally inactive locking dogs disposed within the limits of said frame, holding means on each of said dogs, means on said frame for maintaining said locking dogs in said normally inactive positions with one of the locking dogs longitudinally spaced from the other and having at least a portion extending alongside said other, means mounting said dogs for movement to raised operative positions above the limits of said frame with said holding means facing in opposite directions and part of one dog positioned above part of the other, and means for retaining said locking dogs in said operative positions above the limits of said frame.

12. A cargo latch comprising a frame having two laterally spaced side plates, a pair of complementary locking dogs pivotally supported in said side plates, such that said dogs can be positioned in an inoperative position with said dogs extending in the same direction when in inoperative position, and in opposite directions when said dogs are in operative position above said side plates, means for supporting said dogs in substantially horizontal positions below the level of said side plates when in inoperative position, and means for maintaining said dogs in their operative position facing in opposite directions when they are moved upwardly relative to said side plates to their operative positions.

13. The invention defined in claim 12 wherein said dogs have opposed locking lugs adapted to coact with complementary means on cargo units when in upright operative position, and with portions of said cargo units and secure them against vertical movement, said dogs also being provided with flat vertical faces to prevent longitudinal movement of cargo units, and means for detachably securing said frame in a selected operative position in a carrier.

14. A locking device of the type described for use in securing cargo against movement in a carrier comprising a frame, a generally U-shaped locking member, a coacting generally T-shaped locking member, means pivotally mounting said locking members in longitudinally spaced relationship in said frame with the leg of said generally T-shaped locking member located between the legs of the U of said generally U-shaped member, whereby when said locking members are raised relative to each other to operative positions above said frame said generally U-shaped locking member straddles said leg of the T of said generally T-shaped locking member, means for securing said locking members in said operative positions, and means for attaching said frame to said carrier.

15. A locking device of the type described for use in securing cargo against movement in a carrier comprising a frame, a first cargo holding member having angularly disposed faces, a second cargo holding member having angularly disposed faces, means movably mounting said members in longitudinally spaced relationship in said frame with at least a portion of one member located in close proximity with a portion of the other member, whereby when said members are moved relative to each other to operative positions above said frame one of said members straddles a portion of the other of said members and said faces are disposed in oppositely facing directions, and means for retaining said members in said operative positions.

16. A cargo latch apparatus comprising a pair of oppositely facing locking dogs, one of said dogs being arranged to assist in securing one cargo unit and the other of said dogs being arranged to assist in securing an adjacent unit, a frame including two spaced parallel side plates, means pivotally mounting said dogs in said plates, means coacting with said dogs for maintaining them in operative position above said side plates for securing cargo units against movement, said last-named means comprising a locking member, means mounting said locking member for movement out of engagement with one of said dogs, said means pivotally mounting said dogs in said plates being spaced longitudinally one from the other in said side plates, whereby when said dogs are moved to inoperative position one locking dog is located in a longitudinally spaced relationship relative to the other, and cargo units can be moved to a desired cargo securing position over the collapsed dogs.

17. A cargo restraining device comprising in combination, a frame, a pair of locking members carried by said frame, each of said members including at least one locking portion, means carried by said frame for supporting said members in a generally horizontal relationship within said frame when said members are in their inoperative positions, means mounting said locking members in the said frame for movement upwardly out of said frame to erected operative positions, means for securing said members in their erected operative positions to locate said locking portions of said members in position to secure cargo against restraint, one of said members being generally U-shaped and provided with a body portion and two spaced legs and the other of said locking members being generally T-shaped, said movable means mounting said locking members being longitudinally spaced in said frame such that the leg of said T of said one of said locking members lies between the legs of said U of the other of said locking members, whereby when said generally U-shaped locking member is raised to its erected operative position it straddles the leg of said generally T-shaped other member and said generally T-shaped member can be raised to its operative position in straddled position relative to the other, and wherein said securing means comprises a latch adapted to coact with said generally T-shaped member to maintain said locking member in operative position.

18. The invention defined in claim 17 wherein one of said locking members is provided with resilient means coacting with said other locking member tending normally to cause said members to tend to separate and maintain said securing means in operative position.

References Cited by the Examiner
UNITED STATES PATENTS

| | | | |
|---|---|---|---|
| 2,439,423 | 4/48 | Fowler | 244—118 |
| 2,944,492 | 7/60 | Clejan | 214—38 |
| 3,059,592 | 10/62 | Cozzoli | 214—38 |

ARTHUR L. LA POINT, *Primary Examiner.*

UNITED STATES PATENT OFFICE
CERTIFICATE OF CORRECTION

Patent No. 3,204,581 September 7, 1965

Robert William Davidson

It is hereby certified that error appears in the above numbered patent requiring correction and that the said Letters Patent should read as corrected below.

Column 12, line 4, for "restraint" read -- movement --.

Signed and sealed this 19th day of April 1966.

(SEAL)
Attest:

ERNEST W. SWIDER
Attesting Officer

EDWARD J. BRENNER
Commissioner of Patents